United States Patent
Houck

(10) Patent No.: US 11,796,726 B2
(45) Date of Patent: Oct. 24, 2023

(54) OPTICAL DEVICE

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 17/663,478

(22) Filed: May 16, 2022

(65) Prior Publication Data
US 2022/0276422 A1   Sep. 1, 2022

Related U.S. Application Data

(63) Continuation of application No. 17/133,172, filed on Dec. 23, 2020, now Pat. No. 11,333,811.

(51) Int. Cl.
*G02B 5/28* (2006.01)
*G01J 3/28* (2006.01)
(Continued)

(52) U.S. Cl.
CPC ............ *G02B 5/285* (2013.01); *G01J 3/2803* (2013.01); *G02B 1/002* (2013.01); *G01J 2003/2809* (2013.01); *G02B 5/22* (2013.01)

(58) Field of Classification Search
CPC ..................................................... G02B 5/285
(Continued)

(56) References Cited

U.S. PATENT DOCUMENTS 11,333,811 B1   5/2022   Houck
2006/0209413 A1   9/2006   Kim et al.
(Continued)

FOREIGN PATENT DOCUMENTS

CN   101000263 A  *  7/2007
CN   102301213 A     12/2011
(Continued)

OTHER PUBLICATIONS

Extended European Search Report for Application No. EP21199202.9, dated Jul. 5, 2022, 9 pages.
(Continued)

*Primary Examiner* — Michael A Lyons
*Assistant Examiner* — Omar H Nixon
(74) *Attorney, Agent, or Firm* — Harrity & Harrity, LLP

(57) ABSTRACT

An optical device may include an optical filter disposed over a first surface of one or more substrates. The optical filter may include an aperture and may be configured to pass light that is received via the aperture and that is associated with one or more wavelength ranges via the one or more substrates based on an angle of incidence of the light on the optical filter. The optical device may include one or more optical elements disposed over a second surface of the one or more substrates that are configured to direct light beams of the light that are associated with a particular wavelength range, of the one or more wavelength ranges, to a particular set of sensor elements of an optical sensor. The optical filter may include a thin film optical interference filter and the one or more optical elements may include one or more metamaterial structures.

20 Claims, 3 Drawing Sheets

(51) Int. Cl.
  *G02B 1/00*   (2006.01)
  *G02B 5/22*   (2006.01)
(58) Field of Classification Search
  USPC .......................................................... 356/300
  See application file for complete search history.

(56) References Cited

U.S. PATENT DOCUMENTS

| | | |
|---|---|---|
| 2007/0188764 A1 | 8/2007 | Nisper et al. |
| 2011/0261365 A1 | 10/2011 | Tisserand et al. |
| 2012/0257855 A1* | 10/2012 | Yamashita ............ G02B 6/4215 385/33 |
| 2012/0268809 A1* | 10/2012 | Guo ........................ G02B 5/201 359/359 |
| 2015/0009484 A1 | 1/2015 | Sesko |
| 2019/0137669 A1 | 5/2019 | Wheatley et al. |
| 2020/0249091 A1 | 8/2020 | Scherer et al. |
| 2020/0363323 A1 | 11/2020 | Quaranta et al. |

FOREIGN PATENT DOCUMENTS

| | | | |
|---|---|---|---|
| CN | 111947779 A | 11/2020 | |
| WO | WO-2008020899 A2 * | 2/2008 | ............ B24B 13/06 |
| WO | 2019101750 A2 | 5/2019 | |

OTHER PUBLICATIONS

Wang., "Cancellation of the Zeroth Order by a Low-contrast Grating," Scientific Reports, Dec. 1, 2015, pp. 1-6, XP055934836, Retrieved from the Internet: [URL:https://www.nature.com/articles/srep16501.pdf.].

* cited by examiner

OPTICAL DEVICE

RELATED APPLICATION

This application is a continuation of U.S. patent application Ser. No. 17/133,172, filed Dec. 23, 2020 (now U.S. Pat. No. 11,333,811), which is incorporated herein by reference in its entirety.

BACKGROUND

An optical sensor system may be utilized to capture information concerning light. For example, the optical sensor system may capture information relating to a set of wavelengths associated with the light. The optical sensor system may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical system includes an optical sensor; and an optical device disposed over the optical sensor, wherein: the optical device comprises an optical filter disposed over a first surface of one or more substrates, wherein: the optical filter comprises an aperture, and the optical filter is configured to pass light that is received via the aperture and that is associated with one or more wavelength ranges via the one or more substrates based on an angle of incidence of the light on the optical filter; the optical device comprises one or more optical elements disposed over a second surface of the one or more substrates, wherein: the one or more optical elements are configured to direct light beams of the light that are associated with a particular wavelength range, of the one or more wavelength ranges, to a particular set of sensor elements of the optical sensor; and a thickness of the one or more optical elements is less than or equal to ten microns.

In some implementations, an optical device includes one or more substrates; an optical filter disposed on a first surface of the one or more substrates, wherein: the optical filter comprises an aperture, and the optical filter is configured to pass light that is received via the aperture and that is associated with one or more wavelength ranges via the one or more substrates based on an angle of incidence of the light on the optical filter; and one or more optical elements disposed on a second surface of the one or more substrates, wherein: the one or more optical elements are configured to direct light beams of the light that are associated with a particular wavelength range, of the one or more wavelength ranges, to a particular set of sensor elements of an optical sensor; and a thickness of the one or more optical elements is less than or equal to ten microns.

In some implementations, an optical device includes an optical filter disposed on a first surface of a first substrate; one or more first optical elements disposed on a first surface of a second substrate; and one or more second optical elements disposed on a second surface of the second substrate, wherein: the optical filter is configured to pass light that is received via an aperture of the optical filter and that is associated with one or more wavelength ranges via the second substrate based on an angle of incidence of the light on the optical filter; the one or more first optical elements are configured to change a propagation direction of the light as the light enters the second substrate after passing through the optical filter; the one or more second optical elements are configured to direct light beams of the light that are associated with a particular wavelength range, of the one or more wavelength ranges, to a particular set of sensor elements of an optical sensor; and a thickness of the one or more first optical elements and a thickness of the one or more second optical elements are each less than or equal to ten microns.

DETAILED DESCRIPTION

Figure 1A:
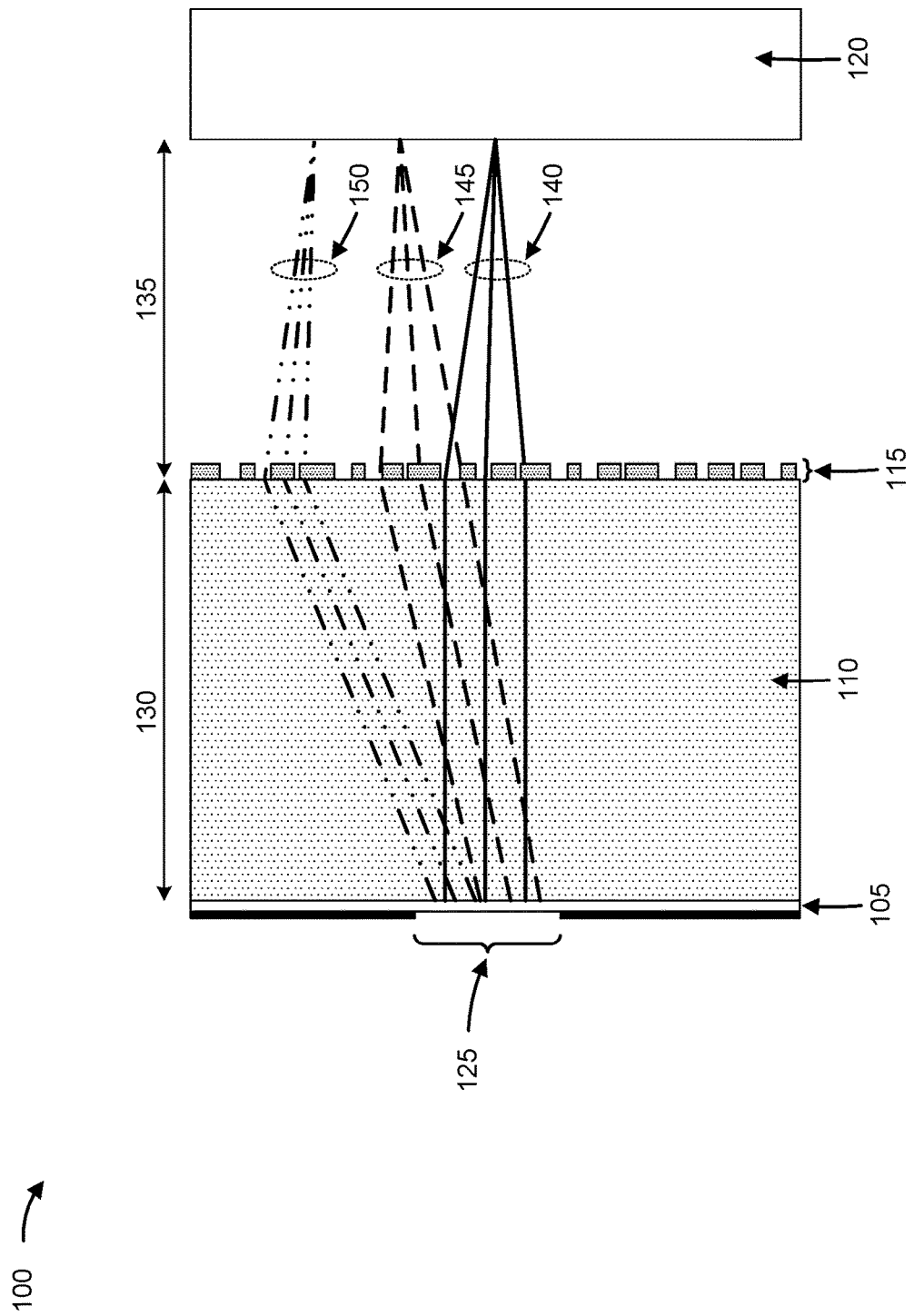
FIGS. 1A-1B are diagrams illustrating examples of an optical system described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical sensor device, such as a spectrometer, may be configured to determine spectral information associated with light (e.g., ambient light) captured by the optical sensor device. The light may enter the optical sensor device and may be received by an optical filter and an optical sensor of the optical sensor device (e.g., wherein the optical filter is disposed on the optical sensor). The optical filter may include a set of optical channels designed to respectively pass light in different wavelength ranges to a set of sensor elements of the optical sensor. This allows the optical sensor to determine spectral information associated with the light that relates to the different wavelength ranges. However, in many cases, to determine high quality spectral information (e.g., that is associated with many spectral data points), the conventional optical sensor device may require a large optical filter (e.g., a linear variable filter (LVF) that requires a substantial length to filter light), a diffraction grating that requires a long optical path to propagate light to the optical sensor, and/or a hyperspectral filter array that requires a large area of coverage, among other examples. Consequently, a conventional optical sensor device has a thickness (e.g., on the order of centimeters) that prevents the conventional optical sensor device from being incorporated into user devices, such as mobile phone devices, that require a smaller form factor (e.g., a thickness on the order of millimeters).

Some implementations described herein provide an optical device that may be disposed over an optical sensor. The optical device may comprise an optical filter disposed over a first surface of one or more substrates. The optical filter may comprise an aperture and may be configured to pass light that is received via the aperture and that is associated with one or more wavelength ranges via the one or more substrates based on an angle of incidence of the light on the optical filter. In some implementations, the optical filter may comprise a thin film optical interference filter.

The optical device may further comprise one or more optical elements disposed over a second surface of the one or more substrates that are configured to direct light beams of the light that are associated with a particular wavelength range, of the one or more wavelength ranges, to a particular set of sensor elements of the optical sensor. In some implementations, the one or more optical elements may comprise one or more metamaterial structures or one or more diffractive surfaces. Accordingly, the one or more optical elements may have a thickness that is less than or equal to ten microns. The optical device may further comprise one or more additional optical elements disposed over a third surface of the one or more substrates (e.g., where the one or more additional optical elements are disposed between the optical filter and the second surface of the one or more substrates). The one or more first optical elements may be configured to change a propagation direction of the light after the light passes through the optical filter. In some implementations, the one or more additional optical elements may comprise one or more metamaterial structures or one or more diffractive surfaces. Accordingly, the one or more additional optical elements may have a thickness that is less than or equal to ten microns.

In this way, the optical device enables the optical sensor to obtain high quality spectral information (e.g., that is associated with many spectral data points) concerning light associated with the one or more wavelength ranges (e.g., based on an angle-dependent wavelength characteristic of the optical filter). Further, because the optical device utilizes a low-profile optical filter (e.g., an optical filter with a thickness on the order of microns) and one or more optical elements (e.g., one or more metamaterial structures with a thickness on the order of nanometers or one or more diffractive surfaces with a thickness on the order of microns), the optical device may have a thickness that satisfies (is less than or equal to) a thickness threshold (e.g., 3 millimeters, 4 millimeters, or 5 millimeters, among other examples), which allows the optical device to be incorporated (e.g., as part of an optical system) into user devices, such as mobile phone devices, that require a small optical system form factor (e.g., on the order of millimeters), which is not possible for conventional optical sensor devices.

Figure 1B:
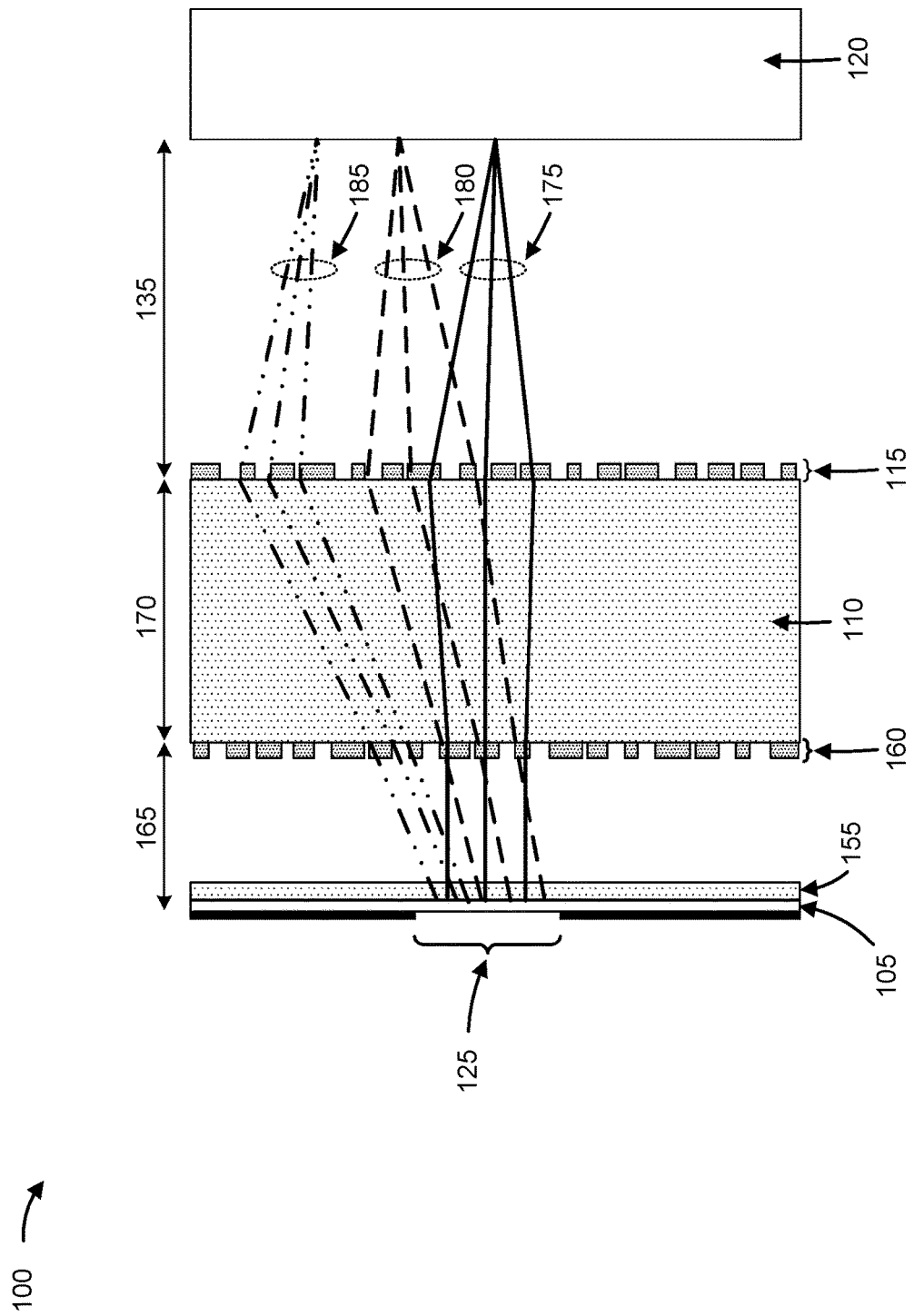

FIGS. 1A-1B are diagrams illustrating examples of an optical system 100. The optical system 100 may be configured to collect light to facilitate analysis of the light (e.g., to determine spectral information associated with the light). As shown in FIG. 1A, the optical system 100 may include an optical filter 105, a substrate 110, one or more optical elements 115, and/or an optical sensor 120. In some implementations, the optical filter 105, the substrate 110, and/or the one or more optical elements 115 may be associated with an optical device (e.g., an optical device that is disposed over the optical sensor 120 in the optical system 100).

The optical filter 105 may include an aperture 125 configured to allow light (e.g., ambient light) to fall incident on the optical filter 105. The aperture 125 may include a window, a lens, or any other type of transmissive optical element that receives light. The aperture 125 may include an aperture stop, or one or more other optical elements, to control an amount of light that falls incident on the optical filter 105 and/or to control a range of incidence angles of the light that falls incident on the optical filter 105 via the aperture 125.

The optical filter 105 may pass one or more wavelengths of light (e.g., the light received via the aperture 125) that falls incident on the optical filter 105 to the substrate 110. In some implementations, the optical filter 105 may include one or more channels (not shown in FIG. 1A) that respectively pass light in different wavelength ranges to the substrate 110. For example, a first channel may pass light associated with a first wavelength range to the substrate 110, a second channel may pass light associated with a second wavelength range to the substrate 110, a third channel may pass light associated with a third wavelength range to the substrate 110, and so on. In some implementations, the optical filter 105 may comprise a thin film optical interference filter. For example, the optical filter 105 may comprise a set of thin film layers (e.g., dielectric thin film layers). The thin film layers may be configured (e.g., the thin film layers may be deposited in an order on the substrate 110) to allow the optical filter 105 to pass light associated with particular wavelength ranges. Additionally, or alternatively, the optical filter 105 may include, an optical interference filter, a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or the like.

In some implementations, the optical filter 105 may have an angle-dependent wavelength characteristic. For example, the optical filter 105 (or a channel of the optical filter 105) may pass light associated with a first wavelength range when the light falls incident on the optical filter 105 within a first incident angle range, may pass light associated with a second wavelength range when the light falls incident on the optical filter 105 within a second incident angle range, may pass light associated with a third wavelength range when the light falls incident on the optical filter 105 within a third incident angle range, and so on. In some implementations, the optical filter 105 may be configured to pass light associated with shorter wavelengths as the light falls on the optical filter 105 at greater incident angles. In some implementations, the angle dependent wavelength characteristic of the optical filter 105 may be represented by the following equation:

$$\lambda_\theta = \lambda_0 \left[1 - \frac{n_0}{n_e}\sin^2\theta\right]^{1/2},$$

where $\lambda_\theta$ represents a peak wavelength at incident angle $\theta$, $\lambda_0$ represents a peak wavelength at incident angle 0, $n_0$ represents a refractive index of the incident medium, $n_e$ represents an effective index of the optical interference filter, and $\theta$ is the incident angle of a light beam.

The substrate 110 may be a glass substrate, a silicon substrate, a germanium substrate, or another type of substrate. As shown in FIG. 1A, the optical filter 105 may be disposed over a surface of the substrate 110, such as an input surface of the substrate 110. As further shown in FIG. 1A, the one or more optical elements 115 may be disposed over a different surface of the substrate, such as an output surface of the substrate 110 (e.g., that opposes the light input surface of the substrate 110). The substrate 110 may have a thickness 130 (e.g., a distance between the input surface and the output surface of the substrate 110). In some implementations, the thickness 130 may be configured to permit or cause light that enters the input surface of the substrate 110 to propagate to the output surface of the substrate 110. In some implementations, the thickness 130 may be configured to facilitate dispersion of the light as the light propagates within the substrate from the input surface of the substrate 110 to the output surface of the substrate 110. Additionally, or alternatively, the thickness 130 may be configured mitigate stress-related cracks or deformities from forming within the substrate 110.

In some implementations, the one or more optical elements 115 may comprise one or more metamaterial structures. The one or more metamaterial structures may include engineered structures (e.g., with an engineered shape, size, geometry, orientation, and/or the like) that have dimensions that are smaller than the one or more wavelength ranges and/or that are arranged in a pattern (e.g., a linear pattern) with distances between the engineered structures that are smaller than the one or more wavelength ranges. In some implementations, the one or more metamaterial structures may have a thickness (e.g., a distance between an input surface of the one or more metamaterial structures and an output surface of the one or more metamaterial structures) of approximately 100 nanometers (nm) to 2 microns (μm). The one or more metamaterial structures may produce a phase delay in light as the light propagates from the output surface of the substrate 110 to the optical sensor 120 and thereby change a propagation direction of the light (e.g., cause the light to diffract, refract, or otherwise bend when the light propagates from the output surface of the substrate 110 to the optical sensor 120). In some implementations, the one or more optical elements 115 may comprise one or more diffractive structures, such as one or more diffractive optical elements, one or more diffractive lenses, and/or one or more diffractive gratings, among other examples that diffract the light as the light propagates from the output surface of the substrate 110 to the optical sensor 120. The one or more diffractive structures may have a thickness (e.g., a distance between an input surface of the one or more diffractive structures and an output surface of the one or more diffractive structures) of approximately 1 μm to 10 μm.

The optical sensor 120 may include a device capable of performing a measurement of light directed toward the optical sensor 120, such as a spectral sensor or a multispectral sensor. The optical sensor 120 may be, for example, a silicon (Si) based sensor, an indium-gallium-arsenide (InGaAs) based sensor, a lead-sulfide (PbS) based sensor, or a germanium (Ge) based sensor, may utilize one or more sensor technologies, such as a complementary metal-oxide-semiconductor (CMOS) technology, or a charge-coupled device (CCD) technology, among other examples. In some implementations, the optical sensor 120 may include multiple sensor elements (e.g., an array of sensor elements, also referred to herein as a sensor array), each configured to obtain information. For example, a sensor element may provide an indication of intensity of light that is incident on the sensor element (e.g., active/inactive or a more granular indication of intensity). While some implementations described herein are directed to the optical sensor 120 being configured to capture spectral information, other implementations are also contemplated. For example, the optical sensor 120 may be configured to capture imaging information, such as hyper-spectral imaging information, multispectral imaging information, and/or the like.

In some implementations, the one or more optical elements 115 may be configured to direct light beams of light that are respectively associated with one or more wavelength ranges to respective regions of the optical sensor 120 (e.g., where a region of the optical sensor includes a set of sensor elements associated with a wavelength range of the one or more wavelength ranges). Additionally, or alternatively, the output surface of the substrate 110 and/or the one or more optical elements 115 may be a distance 135 from an input surface of the optical sensor 120. The distance 135 may be associated with a focal distance of the one or more optical elements 115. In this way the output surface of the substrate 110 and/or the one or more optical elements 115 may be positioned relative to the optical sensor 120 such that the distance 135 allows the one or more optical elements 115 to direct (e.g., to converge, focus, and/or the like) the light beams of light that are respectively associated with the one or more wavelength ranges to the respective regions (and only the respective regions) of the optical sensor 120.

As an example, light may be received by the optical filter 105 via the aperture 125. The optical filter 105 may be configured to pass light beams of the light that are associated with a first wavelength range and that fall incident on the optical filter 105 within a first incident angle range, to pass light beams of the light that are associated with a second wavelength range and that fall incident on the optical filter 105 within a second incident angle range, to pass light beams of the light that are associated with a third wavelength range and that fall incident on the optical filter 105 within a third incident angle range, and so on. Accordingly, as shown in FIG. 1A, the optical filter 105 may pass, to the substrate 110, a set of light beams 140 associated with the first wavelength range and that fall incident on the optical filter 105 within the first incident angle range, a set of light beams 145 associated with the second wavelength range and that fall incident on the optical filter 105 within the second incident angle range, and a set of light beams 150 associated with the third wavelength range and that fall incident on the optical filter 105 within the third incident angle range.

As shown in FIG. 1A, the set of light beams 140, the set of light beams 145, and the set of light beams 150 may propagate from the input surface of the substrate 110 to the output surface of the substrate 110. A light beam of a set of light beams (e.g., of the set of light beams 140, the set of light beams 145, or the set of light beams 150) may propagate through the substrate 110 at an angle that matches (e.g., is the same as, within a tolerance) an incident angle of the light beam on the optical filter 105.

The one or more optical elements 115 may be configured to direct a particular set of light beams (e.g., that are associated with a particular wavelength range) to a particular region of the optical sensor 120 that includes a set of sensor elements (e.g., one or more sensor elements). For example, as shown in FIG. 1A, the one or more optical elements 115 may direct the set of light beams 140 to a first region of the optical sensor 120 (e.g., that includes a first set of sensor elements), may direct the set of light beams 145 to a second region of the optical sensor 120 (e.g., that includes a second set of sensor elements), and may direct the set of light beams 150 to a third region of the optical sensor 120 (e.g., that includes a third set of sensor elements). The first region, the second region, and the third region may have a same, similar, or different size or shape. The first set of sensor elements, the second set of sensor elements, and the third set of sensor elements may have a same or different number of sensor elements.

In some implementations, a thickness associated with an optical device that comprises the optical filter 105, the substrate 110, and the one or more optical elements 115 may be a distance from the input surface of the optical filter 105 to an input surface of the optical sensor 120 (e.g., a sum of the thickness 130 and the distance 135). The thickness 130 and the distance 135 may be configured to cause the thickness associated with the optical device to satisfy (e.g., be less than or equal to) a thickness threshold, such as 3 mm, 4 mm, or 5 mm, among other examples. In this way, the optical device and/or the optical system 100 may be included in a user device (e.g., as further described herein in relation to FIG. 2).

Turning to FIG. 1B, the optical system 100 may include the optical filter 105 (e.g., that includes the aperture 125), the substrate 110, the one or more optical elements 115, and/or the optical sensor 120, a substrate 155, and/or one or more additional optical elements 160. As described herein in relation to FIG. 1A, the one or more optical elements 115 may be disposed over a surface of the substrate 110, such as the output surface of the substrate 110, and the output surface of the substrate 110 and/or the one or more optical elements 115 may be the distance 135 from the input surface of the optical sensor 120. In some implementations, the optical filter 105, the substrate 110, the one or more optical elements 115, the substrate 155, and/or the one or more additional optical elements 160 may be associated with an optical device (e.g., an optical device that is disposed over the optical sensor 120 in the optical system 100).

As further shown in FIG. 1B, the optical filter 105 may be disposed over a surface of the substrate 155 that is separate from the substrate 110. The substrate 155 may be a glass substrate, a silicon substrate, a germanium substrate, or another type of substrate. As shown in FIG. 1B, an input surface of the optical filter 105 may be a distance 165 from the input surface of the substrate 110 and/or one or more additional optical elements 160.

As further shown in FIG. 1B, the one or more additional optical elements 160 may be disposed over a surface of the substrate 110, such as the input surface of the substrate 110 (and the one or more optical elements 115 may be disposed over an opposite surface of the substrate 110, such as the output surface of the substrate 110). The one or more additional optical elements 160 may comprise one or more metamaterial structures or one or more diffractive structures (e.g., as described herein in relation to FIG. 1A). The one or more additional optical elements 160 may be configured to change a propagation direction of light as the light enters the substrate 110 via the input surface of the substrate 110. For example, as shown in FIG. 1B, the one or more additional optical elements may diffract, refract, or otherwise bend light when the light propagates into the substrate 110 via the input surface of the substrate 110 from the optical filter 105 (and the substrate 155).

As shown in FIG. 1B, the substrate 110 may have a thickness 170 (e.g., a distance between the input surface and the output surface of the substrate 110). In some implementations, the thickness 130 may be configured to permit or cause light that enters the input surface of the substrate 110 (e.g., via the one or more additional optical elements 160) to propagate to the output surface of the substrate 110. The thickness 170 of the substrate 110 shown in FIG. 1B may be less than the thickness 130 of the substrate 110 shown in FIG. 1A (e.g., due to the one or more additional optical elements 160 changing a propagation direction of light as the light enters the substrate 110 via the input surface of the substrate 110).

As an example, light may be received by the optical filter 105 via the aperture 125. The optical filter 105 may be configured to pass light beams of the light that are associated with one or more wavelength ranges via the substrate 155 based on an angle of incidence of the light beams on the optical filter 105. Accordingly, as shown in FIG. 1B, the optical filter may pass, to the substrate 155, a set of light beams 175 associated with a first wavelength range and that fall incident on the optical filter 105 within a first incident angle range, a set of light beams 180 associated with a second wavelength range and that fall incident on the optical filter 105 within a second incident angle range, and a set of light beams 185 associated with a third wavelength range and that fall incident on the optical filter 105 within a third incident angle range.

As shown in FIG. 1B, the set of light beams 175, the set of light beams 180, and the set of light beams 185 may propagate through the substrate 155 and to the input surface of the substrate 110. A light beam of a set of light beams (e.g., of the set of light beams 175, the set of light beams 180, or the set of light beams 185) may propagate through the substrate 155 and to the input surface of the substrate 110 (e.g., through free space) at an angle that matches (e.g., is the same as. within a tolerance) an incident angle of the light beam on the optical filter 105.

The one or more additional optical elements 160 may be configured to change a propagation direction of the light beam as the light beam enters the substrate 110 via the input surface of the substrate 110. For example, as shown in FIG. 1B, individual light beams of a set of light beams (e.g., of the set of light beams 175, the set of light beams 180, or the set of light beams 185) may propagate through the substrate 110 to an output surface of the substrate 110 at angles that are different from each other and/or that are different than respective incident angles of the individual light beams on the optical filter 105.

The one or more optical elements 115 may be configured to direct a particular set of light beams (e.g., that are associated with a particular wavelength range) to a particular region of the optical sensor 120 that includes a set of sensor elements (e.g., one or more sensor elements). For example, as shown in FIG. 1B, the one or more optical elements 115 may direct the set of light beams 175 to a first region of the optical sensor 120 (e.g., that includes a first set of sensor elements), may direct the set of light beams 180 to a second region of the optical sensor 120 (e.g., that includes a second set of sensor elements), and may direct the set of light beams 185 to a third region of the optical sensor 120 (e.g., that includes a third set of sensor elements). The first region, the second region, and the third region may have a same, similar, or different size or shape. The first set of sensor elements, the second set of sensor elements, and the third set of sensor elements may have a same or different number of sensor elements.

In some implementations, a thickness associated with an optical device that comprises the substrate 110, the one or more optical elements 115, the substrate 155, and/or the one or more additional optical elements 160 may be a distance from the input surface of the optical filter 105 to an input surface of the optical sensor 120 (e.g., a sum of the distance 135, the distance 165, and the thickness 170). The distance 135, the distance 165, and the thickness 170 may be configured to cause the thickness associated with the optical device to satisfy (e.g., be less than or equal to) a thickness threshold, such as 3 mm, 4 mm, or 5 mm, among other examples. In this way, the optical device and/or the optical system 100 may be included in a user device (e.g., as further described herein in relation to FIG. 2).

As indicated above, FIGS. 1A-1B are provided as examples. Other examples may differ from what is described with regard to FIGS. 1A-1B.

Figure 2:
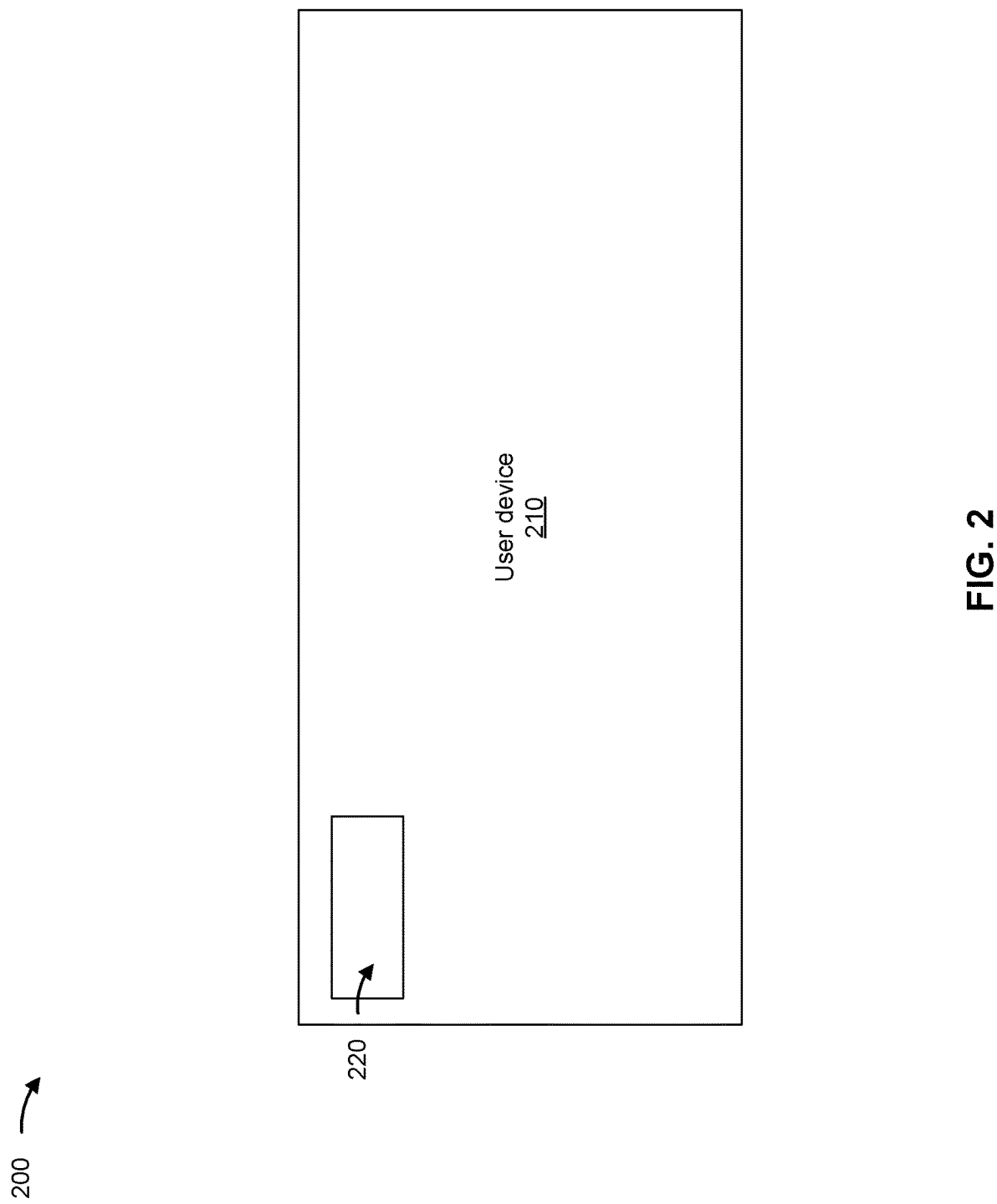
FIG. 2 is a diagram illustrating an example of a user device that may include an optical system described herein.

FIG. 2 is a diagram illustrating an example 200 of a user device 210 that may include an optical system 220. User device 210 may include, for example, a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), a spectrometer, or a similar type of device. The optical system 220 may include the optical system 100 or a similar optical system (e.g., that utilizes the optical filter 105, the substrate 110, the one or more optical elements 115, the substrate 155, and/or the one or more additional optical elements 160). The optical system 220 may be included in an optical package of the user device 210. By reducing the size of the optical system 220, the optical system 220 may be implemented in user devices 210, or the optical system 220 may have a smaller footprint in a user device 210 than a conventional optical system.

As indicated above, FIG. 2 is provided as an example. Other examples may differ from what is described with regard to FIG. 2.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
   an optical filter having an aperture that is configured to receive light; and
   a substrate that is configured to propagate the light therethrough, the substrate comprising:
      an input surface that faces the optical filter, and
      an output surface having a plurality of optical elements projecting therefrom, wherein
         the output surface is configured to face an optical sensor,
         the plurality of optical elements include:
            a metamaterial structure that is smaller than a wavelength range of a beam, of the light, that is passed through a channel of the optical filter,
            a plurality of metamaterial structures, or
            one or more diffractive structures, and
         the plurality of optical elements are configured to direct beams of the light to a particular set of sensor elements of the optical sensor.

2. The optical device of claim 1, wherein the optical filter comprises a thin film optical interference filter.

3. The optical device of claim 1,
   wherein the channel is a first channel,
   wherein the wavelength range is a first wavelength range,
   wherein the optical filter further includes:
      a second channel that is configured to pass a different beam, of the light, associated with a second wavelength range to the substrate.

4. The optical device of claim 3, wherein an optical element, of the plurality of optical elements, is the metamaterial structure, and
   wherein the metamaterial structure is smaller than each of the first wavelength range and the second wavelength range.

5. The optical device of claim 3,
   wherein the plurality of optical elements include the plurality of metamaterial structures, and
   wherein the plurality of metamaterial structures are arranged such that a distance between two metamaterial structures, of the plurality of metamaterial structures, is smaller than each of the first wavelength range and the second wavelength range.

6. The optical device of claim 1, wherein a thickness of each of the plurality of optical elements is less than or equal to 10 microns.

7. An optical device, comprising:
   an optical filter including:
      an aperture, and
      one or more channels; and
   a substrate that is configured to propagate light therethrough, the substrate having a plurality of optical elements projecting therefrom,
      wherein the plurality of optical elements are configured to direct beams of the light that are respectively associated with different wavelength ranges to respective regions of an optical sensor, wherein the plurality of optical elements include:
a metamaterial structure that is smaller than a wavelength range of a beam, of the light, that is passed through a channel of the one or more channels, or
a plurality of metamaterial structures,
wherein the aperture is configured to receive the light, and
wherein the one or more channels are configured to respectively pass the beams to the substrate.

8. The optical device of claim 7, wherein the optical filter comprises a thin film optical interference filter.

9. The optical device of claim 7, wherein
the different wavelength ranges include a first wavelength range, a second wavelength range, and a third wavelength range, and
the beams include:
a first beam associated with the first wavelength range,
a second beam associated with the second wavelength range, and
a third beam associated with the third wavelength range.

10. The optical device of claim 7, wherein the plurality of optical elements include the plurality of metamaterial structures, and
wherein the plurality of metamaterial structures are respectively smaller than each of the different wavelength ranges.

11. The optical device of claim 7, wherein the plurality of optical elements include the plurality of metamaterial structures, and
wherein the plurality of metamaterial structures are arranged such that a distance between two metamaterial structures, of the metamaterial structures, is smaller than each of the different wavelength ranges.

12. The optical device of claim 7, wherein
the substrate includes an output surface that is configured to face the optical sensor, and
the plurality of optical elements project from the output surface.

13. The optical device of claim 7, wherein a thickness of each of the plurality of optical elements is less than or equal to 10 microns.

14. An optical system, comprising:
an optical filter having an aperture that is configured to receive light;
an optical sensor that is configured to perform a measurement of the light; and
a substrate arranged therebetween and configured to propagate the light therethrough, the substrate comprising:
an input surface that faces the optical filter, and
an output surface having a plurality of optical elements projecting therefrom toward the optical sensor,
wherein the plurality of optical elements include:
a metamaterial structure that is smaller than a wavelength range of a beam, of the light, that is passed through a channel of the optical filter,
a plurality of metamaterial structures, or
one or more diffractive structures; and
wherein the plurality of optical elements are configured to direct beams of the light to a particular set of sensor elements of the optical sensor.

15. The optical system of claim 14, wherein the optical filter is a thin film optical interference filter.

16. The optical system of claim 14, wherein the optical filter further includes:
a different channel configured to pass a different beam, of the light, associated with a different wavelength range to the substrate.

17. The optical system of claim 16, wherein the plurality of optical elements include the plurality of metamaterial structures.

18. The optical system of claim 14, wherein a thickness of each of the plurality of optical elements is less than or equal to 10 microns.

19. The optical system of claim 14, wherein a distance between the output surface of the substrate and an input surface of the optical sensor is less than or equal to 5 millimeters.

20. The optical system of claim 14, wherein the plurality of optical elements include the metamaterial structure.

* * * * *